(12) United States Patent
Wakabayashi et al.

(10) Patent No.: US 7,023,336 B2
(45) Date of Patent: Apr. 4, 2006

(54) LAMP CONTROL APPARATUS

(75) Inventors: Akira Wakabayashi, Tokyo (JP);
Atsushi Maeda, Tokyo (JP)

(73) Assignee: Niles Parts Co., Ltd., (JP)

( * ) Notice: Subject to any disclaimer, the term of this patent is extended or adjusted under 35 U.S.C. 154(b) by 0 days.

(21) Appl. No.: 10/448,214

(22) Filed: May 30, 2003

(65) Prior Publication Data
US 2003/0222776 A1 Dec. 4, 2003

(30) Foreign Application Priority Data
Jun. 4, 2002 (JP) .......................... P2002-163468

(51) Int. Cl.
*B60Q 1/34* (2006.01)
(52) U.S. Cl. ...................... 340/475; 340/465; 340/468; 340/471; 340/479; 340/331; 340/332
(58) Field of Classification Search ................ 340/475, 340/465, 468, 471, 478, 479, 331, 332; 362/498, 362/499
See application file for complete search history.

(56) References Cited
U.S. PATENT DOCUMENTS

| | | | | |
|---|---|---|---|---|
| 4,290,048 A | * | 9/1981 | Cutlip et al. ................ | 340/432 |
| 5,528,218 A | * | 6/1996 | Rigsby ....................... | 340/475 |
| 6,031,451 A | * | 2/2000 | Graves et al. .............. | 340/468 |

* cited by examiner

*Primary Examiner*—Daryl C. Pope
(74) *Attorney, Agent, or Firm*—Rader, Fishman & Grauer PLLC

(57) ABSTRACT

Left and right lamps or rear are connected to a stop lamp switch or a turn signal switch by left and right relays. When the turn signal switch is made ON to left and an intermittent signal is inputted from a flasher unit, a left relay is made ON by an output of a left integrating circuit and a left lamp is flashed in accordance with the intermittent signal. During the time period, an NAND circuit for inputting the intermittent signal is made H. Since a right relay is made OFF, when the stop lamp switch is made ON, a right lamp is continuously lighted. Thereafter, when the turn signal switch is made OFF, the NAND circuit is made L and the left relay is made OFF by rapidly discharging the left integrating circuit. Thereby, also the left lamp is shifted to light continuously without delay.

4 Claims, 8 Drawing Sheets

| SWITCH MODE | INPUT TO COM | OUTPUT OF INVERTER | OUTPUT TO NAND |
|---|---|---|---|
| OFF | Me | H | L |
| ON | L | H | H |
|  | H | L | H |

LAMP CONTROL APPARATUS

BACKGROUND OF THE INVENTION

1. Field of the Invention

The present invention relates to a control apparatus of a lamp used both as, for example, a stop lamp indicating braking of a vehicle and another lamp of, for example, a turn signal lamp or the like.

2. Description of Related Art

Conventionally, when a lamp is used both as a stop lamp and a turn signal lamp or the like in a vehicle, in order to give priority to a function of a lamp to be flashed, a circuit constitution as shown by FIG. 9 is adopted.

Here, there is provided a multifunction switch 50 comprising a plurality of change-over switches 62, 64 and 66 constituting a hazard switch 60 and a plurality of changeover switches 72, 74, 76 and 78 constituting a turn signal switch 70 and the hazard switch 60 is inputted with an output from a stop lamp switch 52 and an intermittent signal from a timing circuit 54.

The turn signal switch 70 is inputted with an output from the hazard switch 60 and the intermittent signal from the timing circuit 54. Further, an output side of the turn signal switch 70 is connected with respective left and right lamps 16L, 18L, 16R and 18R of front and rear.

In the case in which both of the hazard switch 60 and the turn signal switch 70 are made OFF (OFF), when a brake, not illustrated, is operated, the output from the stop lamp 52 continuously light the left and right lamps 18L and 18R of rear from the change-over switch 62 via the change-over switches 76 and 78.

When the hazard switch 60 is made ON (ON) under the state, the output from the stop lamp switch 52 is cut by the change-over switch 62, the intermittent signal from the timing circuit 54 intermittently lights (hereinafter, flashes) the left and right lamps 16L and 16R of front from the change-over switches 64 and 66 of the hazard switch via the change-over switches 72 and 74 and flashes the left and right lamps 18L and 18R of rear from the change-over switch 62 via the change-over switches 76 and 78.

When the hazard switch 60 and the stop lamp switch 52 are made OFF and the turn signal switch 70 is made ON to left or right direction, the intermittent signal from the timing circuit 54 flashes the left lamps 16L and 18L of front and rear or the right lamps 16R and 18R via the change-over switches 72 and 74.

Further, when the brake is operated during the time period, a signal from the stop lamp switch 52 continuously light the lamp of rear on a side of not flashing from the change-over switch 62 via the change-over switches 76 and 78 of the turn signal switch 70.

However, according to the above-described conventional circuit constitution, inside the multifunction switch 50, there are needed an extremely large number of the change-over switches each having a mechanical contact related to conduction of large current supplied to the lamps as the turn signal switch 70 and the hazard switch 60. According to the change-over switch having such a mechanical contact, not only the cost is high but also a difficulty is accompanied in ensuring durability. Further, there poses a problem that emittance of operating sound is unavoidable.

Although as a countermeasure thereagainst, it is conceivable to replace the change-over switch to a circuit of a logical element which is not provided with a mechanical contact, since large current is dealt with, simple replacement cannot be carried out.

SUMMARY OF THE INVENTION

Therefore, in view of the above-described problems, it is an object of the invention to provide a lamp control apparatus for a vehicle in which a number of switches requiring mechanical contacts is constituted by a necessary minimum while enabling to control lamps used both for continuous lighting and flashing operation as in a stop lamp and a turn signal lamp.

Therefore, according to the invention, in a lamp control apparatus for switching continuous lighting and flashing operation of a lamp, a number of change-over switches having mechanical contacts is made as small as possible by enabling adoption of a logical circuit, the lamp control apparatus including a relay for connecting to switch a lamp to a first switch for continuously lighting the lamp or a second switch for operating the lamp to flash by connecting to an intermittent signal source, a switch mode determining circuit for determining a state of the second switch, and relay driving means for driving the relay based on an output of the switch mode determining circuit, when both of the first switch and the second switch are made ON, the lamp is connected to the second switch by the relay to operate to flash the lamp.

BRIEF DESCRIPTION OF THE DRAWINGS

FIG. 4 is a chart showing a state when a stop lamp switch is made ON;

FIG. 5 is a chart showing a state when a hazard switch is made ON;

FIG. 6 is a chart showing a state when a turn signal switch is made ON;

FIG. 7 is a chart showing a state in which both of the stop lamp switch and the turn signal switch are made ON;

DESCRIPTION OF PREFERRED EMBODIMENTS

A mode for carrying out the invention will be explained as follows.

Figure 1:
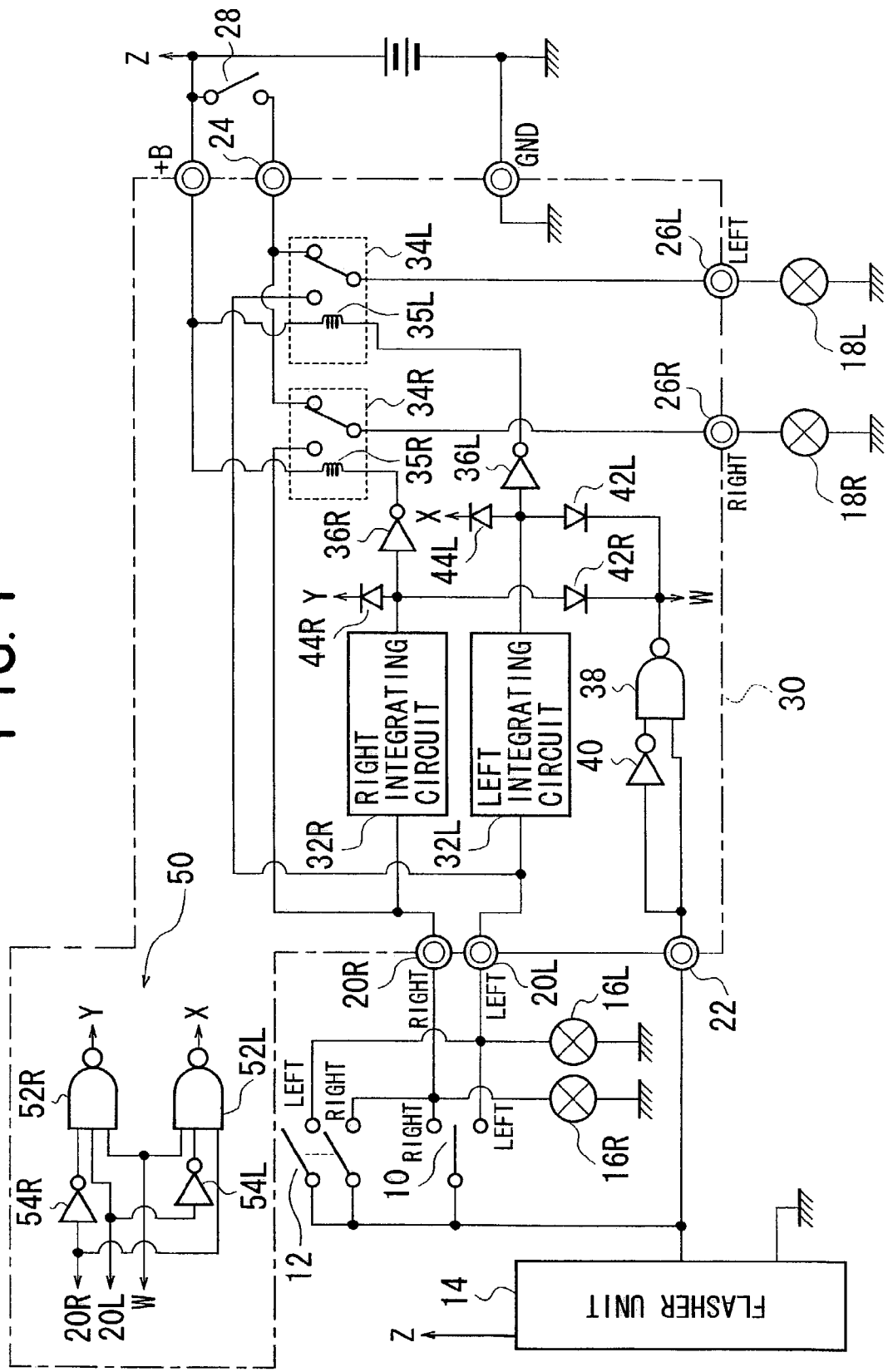
FIG. 1 is a diagram showing a constitution of an embodiment of the invention.

FIG. 1 is a diagram showing a constitution of a mode for carrying out the invention.

First, according to the embodiment, a turn signal switch 10 is constructed by a two contacts switching constitution for selecting left or right. Further, a hazard switch 12 is constructed by a two circuit constitution having left and right respective single contacts.

Respective signal source sides of the turn signal switch 10 and the hazard switch 12 are connected to a flasher unit 14 for generating an intermittent signal.

Respective "left" contacts of the turn signal switch 10 and the hazard switch 12 are connected to a left lamp 16L of the front and respective "right" contacts of the turn signal switch 10 and the hazard switch 12 are connected to a right lamp 16R of the front.

The respective "left" contacts and "right" contacts of the turn signal switch 10 and the hazard switch 12 are further connected respectively to a "left" input terminal 20L and a "right" input terminal 20R of a control unit 30 and the signal source sides of the turn signal switch 10 and the hazard switch 12 are connected to a "COM" terminal 22.

The control unit 30 is provided with a "STOP" input terminal 24, a "left" output terminal 26L and a "right" output terminal 26R and the "STOP" input terminal 24 is inputted with an output from a stop lamp switch 28. The "left" output terminal 26L and the "right" output terminal 26R are respectively connected with a left lamp 18L of rear and a right lamp 18R of rear. Further, the control unit 30 is provided with +B connected to a power source and a power source terminal of GND.

Inside the control unit 30, the "left" input terminal 20L and the "right" input terminal 20R are respectively connected with a left integrating circuit 32L and a right integrating circuit 32R.

Further, there are provided a left relay 34L for connecting the "left" output terminal 26L to switch to the "left" input terminal 20L or the "STOP" input terminal 24 and a right relay 34R for connecting the "right" output terminal 26R to switch to the "right" input terminal 20R or the "STOP" input terminal 24.

One of the side ends of respective relay coils 35L and 35R of the left relay 34L and the right relay 34R are connected to +B. Further, the other end of the relay coil 35L of the left relay 34L is connected to the left integrating circuit 32L via an inverter 36L and other end of the relay coil 35R of the right relay 34R is connected to the right integrating circuit 32R via an inverter 36R.

The left relay 34L and the right relay 34R constitute a side of connecting to the "STOP" input terminal 24 when the relay coils are not conducting.

The control unit 30 further includes an NAND circuit 38 and one input of the NAND circuit 38 is directly connected to the "COM" terminal 22 and other input thereof is connected to the "COM" terminal 22 via an inverter 40.

A connection point of the inverter 36L and the left integrating circuit 32L and a connection point of the inverter 36R and the right integrating circuit 32R are connected to an output of the NAND circuit 38 respectively via diodes 42L and 42R. Cathodes of the respective diodes 42L and 42R constitute a side of the NAND circuit 38.

Here, the left integrating circuit 32L and the inverter 36L as well as the right integrating circuit 32R and the inverter 36R respectively constitute relay driving means according to the invention.

The NAND circuit 38 grounds an output terminal thereof when an output thereof is at L level to thereby rapidly discharge the left integrating circuit 32L or the right integrating circuit 32R connected therewith.

The "left" input circuit 20L, the "right" input circuit 20R and the "COM" terminal 22 are further connected to a discharge circuit 50.

The discharge circuit 50 includes two of three-inputs NAND circuits 52L and 52R.

Inputs of the NAND circuit 52L are respectively connected directly to the output of the NAND circuit 38 and the "right" input terminal 20R and connected to the "left" input terminal 20L via an inverter 54L.

Inputs of the NAND circuit 52R are respectively connected directly to the output of the NAND circuit 38 and the "left" input terminal 20L and connected to the "right" input terminal 20R via an inverter 54R.

The output of the NAND circuit 52L is connected to the connection point of the left integrating circuit 32L and the inverter 36L via a diodes 44L and the output of the NAND circuit 52R is connected to the connection point of the right integrating circuit 32R and the inverter 36R via a diode 44R. Cathodes of the respective diodes 44L and 44R constitute sides of the NAND circuits 52L and 52R.

In a state in which the switch mode is made ON, that is, the output of the NAND circuit 38 is at H, when the "right" input terminal 20R is at H and the "left" input terminal 20L is at L, all of the three inputs of the NAND circuit 52L becomes H and the output becomes L level.

Similarly, when the switch mode is made ON, the "left" input terminal 20L is at H and the "right" input terminal 20R is at L, the output of the NAND circuit 52R becomes the L level.

When the output of each of the NAND circuits 52L and 52R is at the L level, the NAND circuit 52L or 52R grounds the output terminal to rapidly discharge the left integrating circuit 32L or the right integrating circuit 32R connected therewith.

The flasher unit 14 which is publicly-known for vehicle use is used, when the turn signal switch 10 and the hazard switch 12 are made OFF, an output terminal voltage thereof is set to a middle potential of Me and when the output terminal voltage is made to be equal to or lower than a predetermined value by grounding an output terminal thereof or the like, the flasher unit 14 is started by constituting a trigger to thereby output an intermittent signal comprising repetition of the H level (power source potential) higher than the middle potential Me and the L level (0V) lower than Me.

Further, although the middle potential Me is lower than the H level, with the L level reference value Vth in the control unit 30, the middle potential Me belongs to the H level only with respect to the NAND circuit 38.

Figures 2, 3:
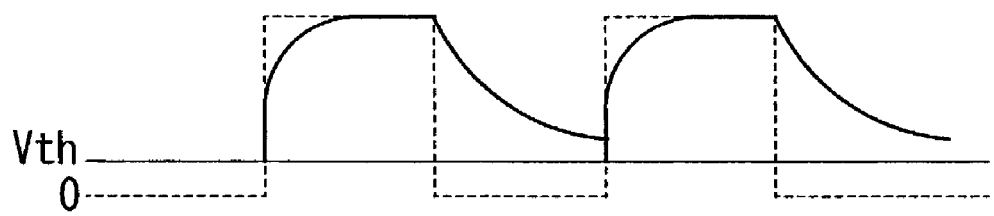
FIG. 2 is a diagram showing a switch mode.
FIG. 3 is a diagram showing a change of voltage of an integrating circuit.

Therefore, as shown by FIG. 2, when both of the turn signal switch 10 and the hazard switch 12 are made OFF and the "COM" terminal 22 is applied with the middle potential Me, an inverted value by the inverter 40 is at H and the output of the NAND circuit 38 becomes the L level. The state of inputting the middle potential Me to the "COM" terminal 22 is referred to as the switch mode (SW mode) OFF state.

Figure 5:
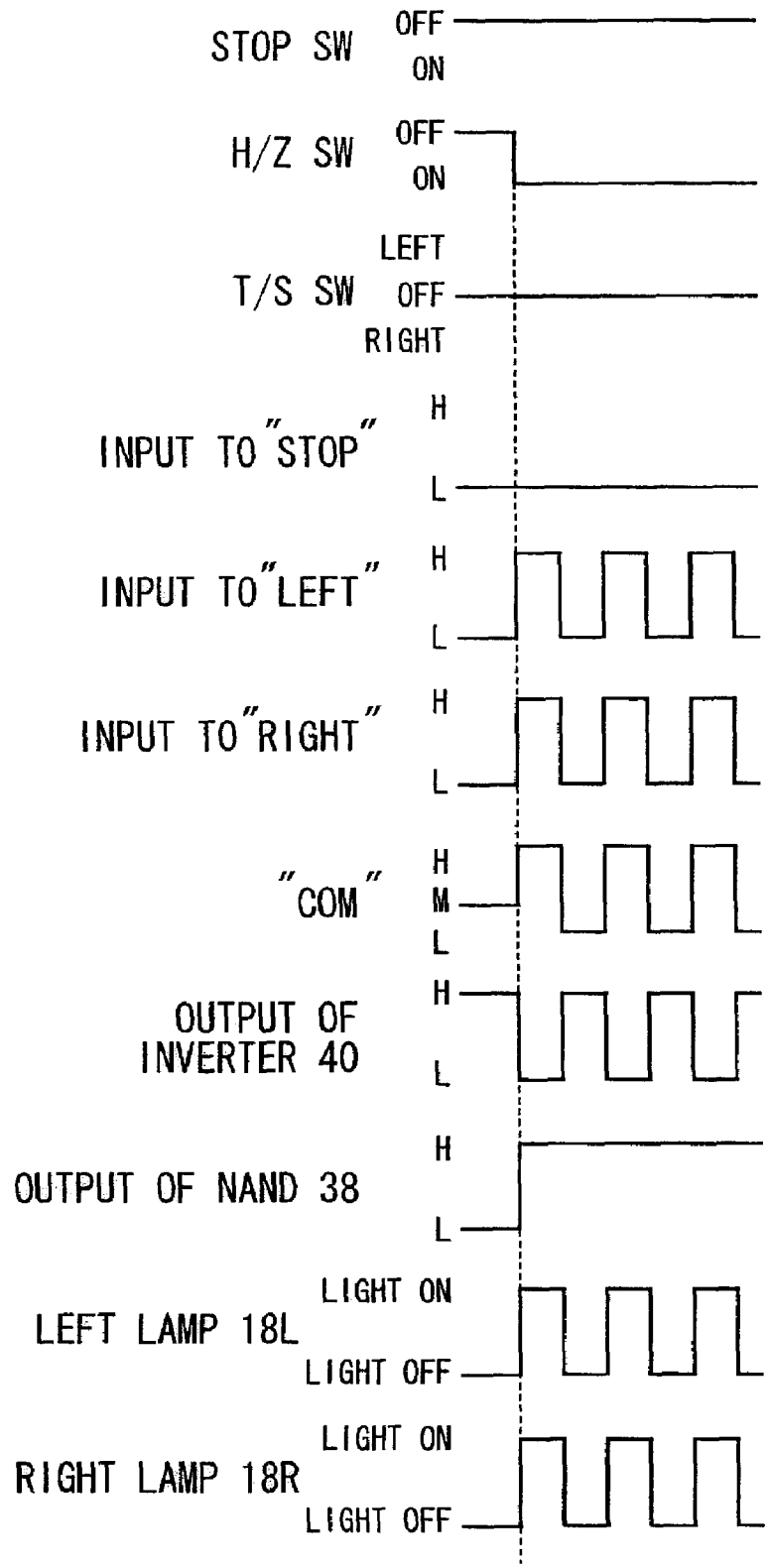

Meanwhile, during a time period in which either of the turn signal switch 10 or the hazard switch 12 is operated and the flasher unit 14 is started, when the "COM" terminal 22 is at H (power source voltage), the output of the inverter 40 becomes L and when the "COM" terminal 22 is at L, the output of the inverter 40 becomes "H" and the output of the NAND circuit 38 becomes the H level (refer to FIG. 5). A state of inputting the intermittent signal of H and L to the "COM" terminal 22 is referred to as a switch mode ON state.

That is, the NAND circuit 38 and the inverter 40 constitute a switch mode determining circuit.

The left or right integrating circuit 32L or 32R is constituted by a publicly-known input resistor and capacitor although not illustrated particularly and as shown by FIG. 3, the integrating circuit shows a change of voltage as shown by a bold line by inputting the intermittent signal from the flasher unit 14 as shown by a broken line. During a time period of the intermittent signal at the L level (0V), the voltage is dropping and at a time point at which the voltage is dropped to a predetermined value, a successive H level is inputted and therefore, during a time period of inputting the intermittent signal, the voltage is higher than a reference value vth and the integrating circuit maintains the H level.

Next, an explanation will be given of operation in the above-described constitution particularly related to the rear lamp.

Figure 4:
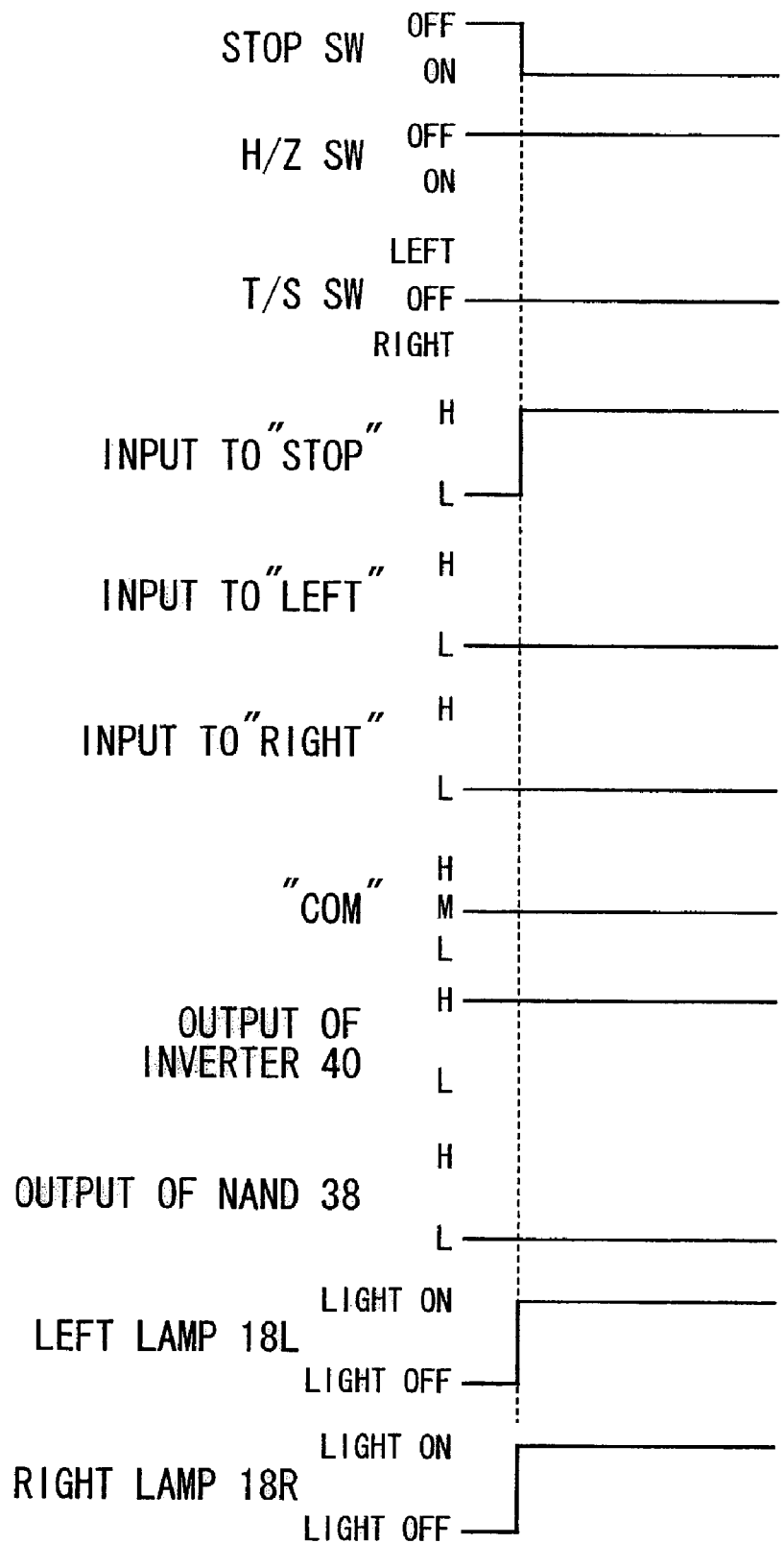

First, FIG. 4 is a chart showing a state of respective switches and terminals or the like when only the stop lamp switch (STOP SW) 28 is made ON.

In this case, the switch mode is OFF, the output of the inverter 40 connected to the "COM" terminal becomes H, the output of the NAND circuit 38 becomes the L level and therefore, the outputs of the inverters 36L and 36R become the H level and the left relay 34L and the right relay 34R are brought into an OFF state.

Thereby, the left relay 34L connects the "left" output terminal 26L to the "STOP" input terminal 24, the right relay 34R connects the "right" output terminal 26R to the "STOP" input terminal 24 and therefore, during a time period in which the stop lamp switch (T/S SW) 28 is made ON, the left and right lamps 18L and 18R of rear are continuously lighted.

FIG. 5 is a chart when only the hazard switch (H/Z SW) 12 is made ON.

The flasher unit 14 is started by grounding the output terminal of the flasher unit 14 via the hazard switch 12 and the left and right lamps 16L and 16R of the front. Thereby, the switch mode is made ON, the output of the inverter 40 repeats L and H and the output of the NAND circuit 38 becomes the H level.

Further, the intermittent signal from the flasher unit 14 is inputted from the "left" input terminal 20L and the "right" input terminal 20R to the left and right integrating circuits 32L and 32R to make the respective integrating circuits at the H level.

With the respective integrating circuits 32L and 32R and the NAND circuit 38 at the H level, the outputs of the inverters 36L and 36R become the L level to make the left relay 34L and the right relay 34R ON and therefore, the left lamp 18L and the right lamp 18R of the rear are flashed in accordance with the intermittent signal along with the left and right lamps 16L and 16R of the front by switching connection respectively to the "left" input terminal 20L and the "right" input terminal 20R.

Figure 6:
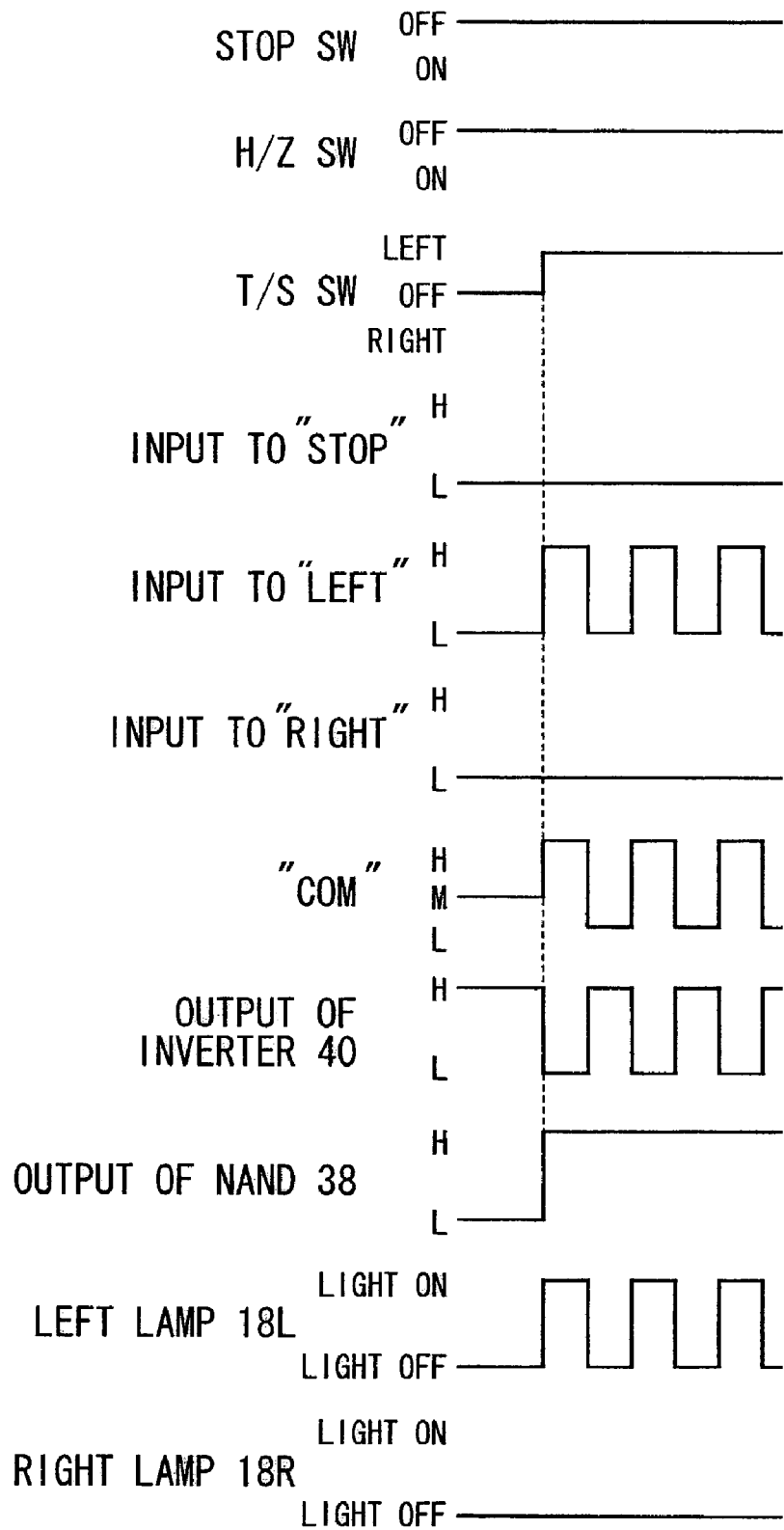

When only the turn signal switch (T/S SW) 10 is operated, with respect to making the "left" side or "right" side ON, similar to the case of making the hazard switch 12 ON, the relay 34L or 34R is made ON and the left lamps 16L and 18L or the right lamps 16R and 18R of the front and the rear are flashed. FIG. 6 shows a state of making the turn signal switch 10 ON to the "left" side.

The lamp of the front on the side which is not made ON is not lighted, and also with respect to the rear, the relay is maintained to a side of connecting to the "STOP" input terminal 24, however, the lamp of the rear is not lighted since the stop lamp switch 28 is not made ON.

Next, an explanation will be given of a case of making both of the stop lamp switch 28 and the turn signal switch 10 ON. The turn signal switch 10 is made ON to the "left" side.

Figure 7:
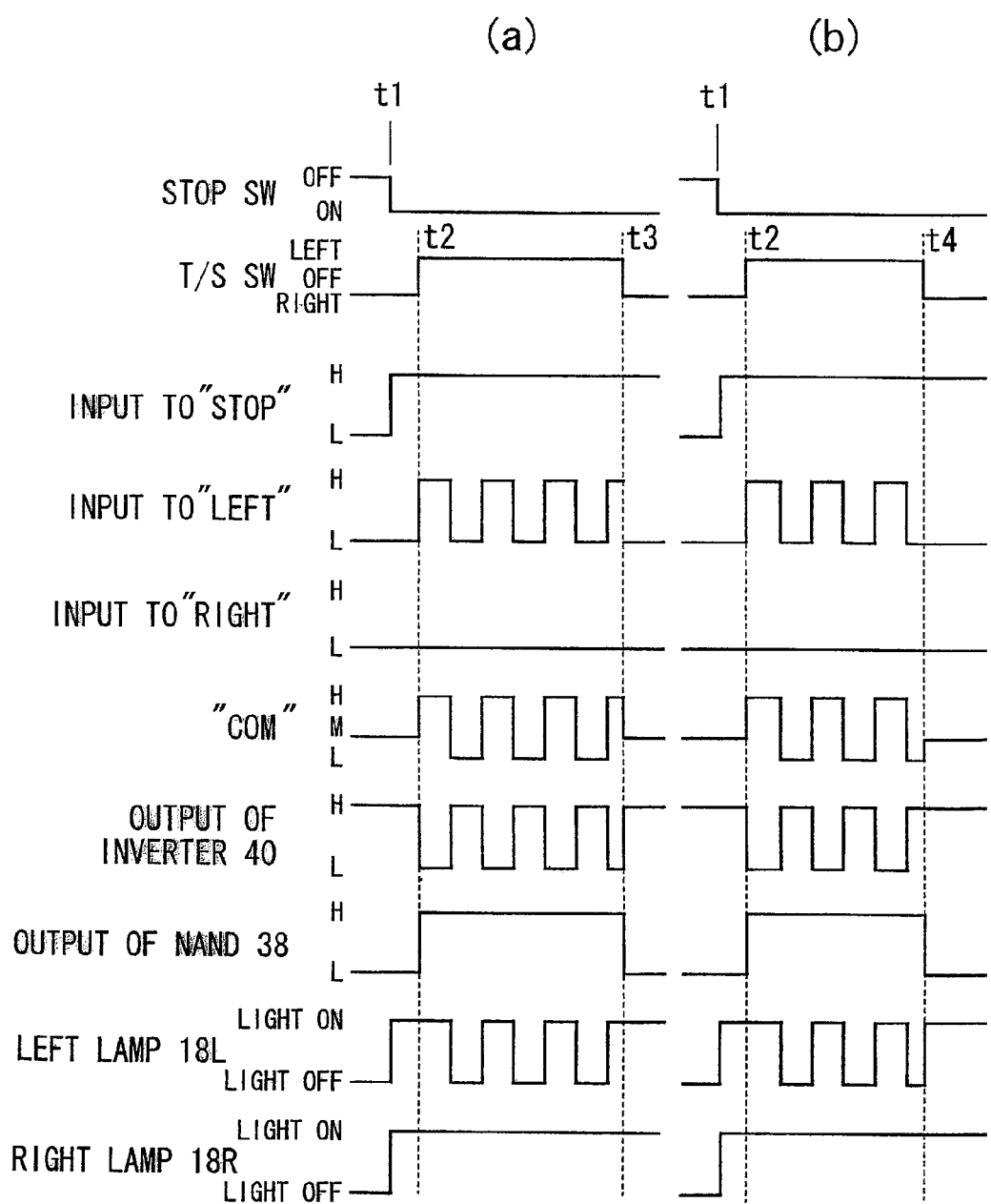

As shown by FIG. 7(a), first, at time t1, when only the stop lamp switch 28 is made ON, the switch mode is made OFF and the left lamp 18L and the right lamp 18R of the rear are lighted.

Thereafter, at t2, when the turn signal switch 10 is made ON, the flasher unit 14 is started, the intermittent signal is inputted to the "left" input terminal 20L and the left lamp 16L of front starts flashing in accordance with the intermittent signal. The "COM" terminal 22 is similarly inputted with the intermittent signal.

Since the switch mode is made ON, the output of the NAND circuit 38 becomes the H level.

Further, the left integrating circuit 32L becomes the H level by inputting the intermittent signal and therefore, the output of the left inverter 36L becomes the L level and the left relay 34L is made ON. Thereby, the left lamp 18L of rear is switched to connect from the side of the "STOP" input terminal 24 to the side of the "left" input terminal 20L and is flashed similar to the left lamp 16L of front.

During the time period, the right integrating circuit 32R becomes the L level, the right relay 34R maintains the OFF state and connects the right lamp 18R of rear to the "STOP" input terminal 24 and therefore, the right lamp 18R of rear maintains a continuously lighted state. Naturally, when the stop lamp switch 28 is made OFF during a time period of maintaining the continuously lighted state, the right lamp 18R of rear is turned off at the time point although not particularly illustrated.

In the state in which the stop lamp switch 28 is made ON, when the turn signal switch 10 is made OFF at time t3, the "COM" terminal 22 is brought into the switch mode OFF state and therefore, the output of the NAND circuit 38 becomes the L level.

Thereby, the left integrating circuit 32L is rapidly discharged via the diode 42L and therefore, the left relay 34L is immediately made OFF, and the left lamp 18L of the rear stops flashing and is brought into the continuously lighted state without delay in accordance with the stop lamp switch 28.

In this way, at and after time t3, the left lamp 18L of rear is brought into the continuously lighted state indicating braking along with the right lamp 18R.

FIG. 7(a) shows a case of a time period in which at time t3 at which the turn signal switch 10 is made OFF, the intermittent signal is at H and the left lamp 18L of the rear is lighted and the left lamp 18L of the rear continues to be lit while it shifts to the continuously lighted state.

Further, when the time of making the turn signal switch 10 OFF is t4 of a time period at which the intermittent signal is at L and the left lamp 18L of rear is turned off, as shown by FIG. 7(b) at the time point t4, similar to the above-described, the left relay 34L becomes immediately OFF and the left lamp 18L of rear is switched to the continuously lighted state without delay in accordance with the stop lamp switch 28.

Figure 8:
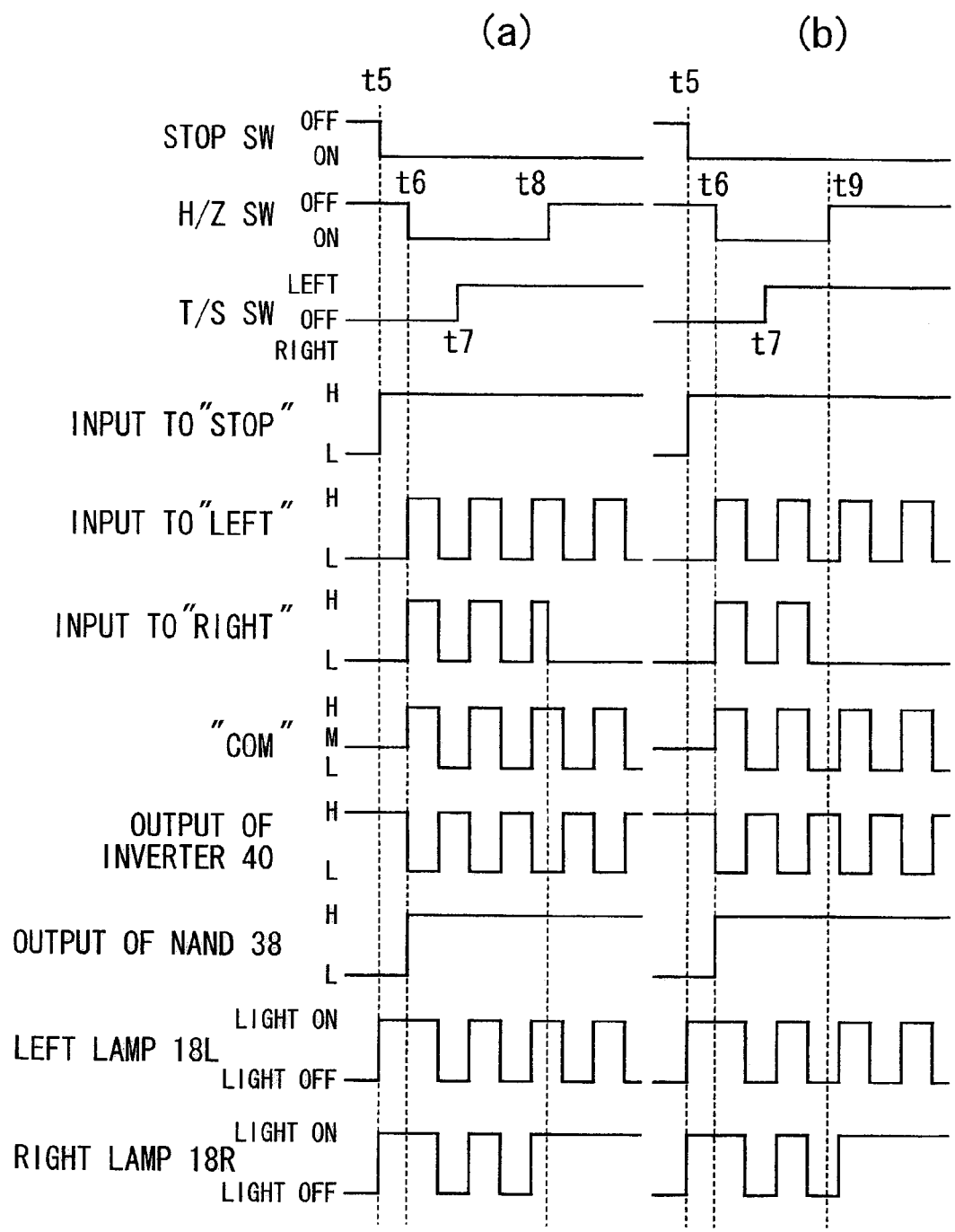
FIG. 8 is a chart showing a change when the stop lamp switch, the hazard switch and the turn signal switch are made ON and thereafter.
Figure 9:
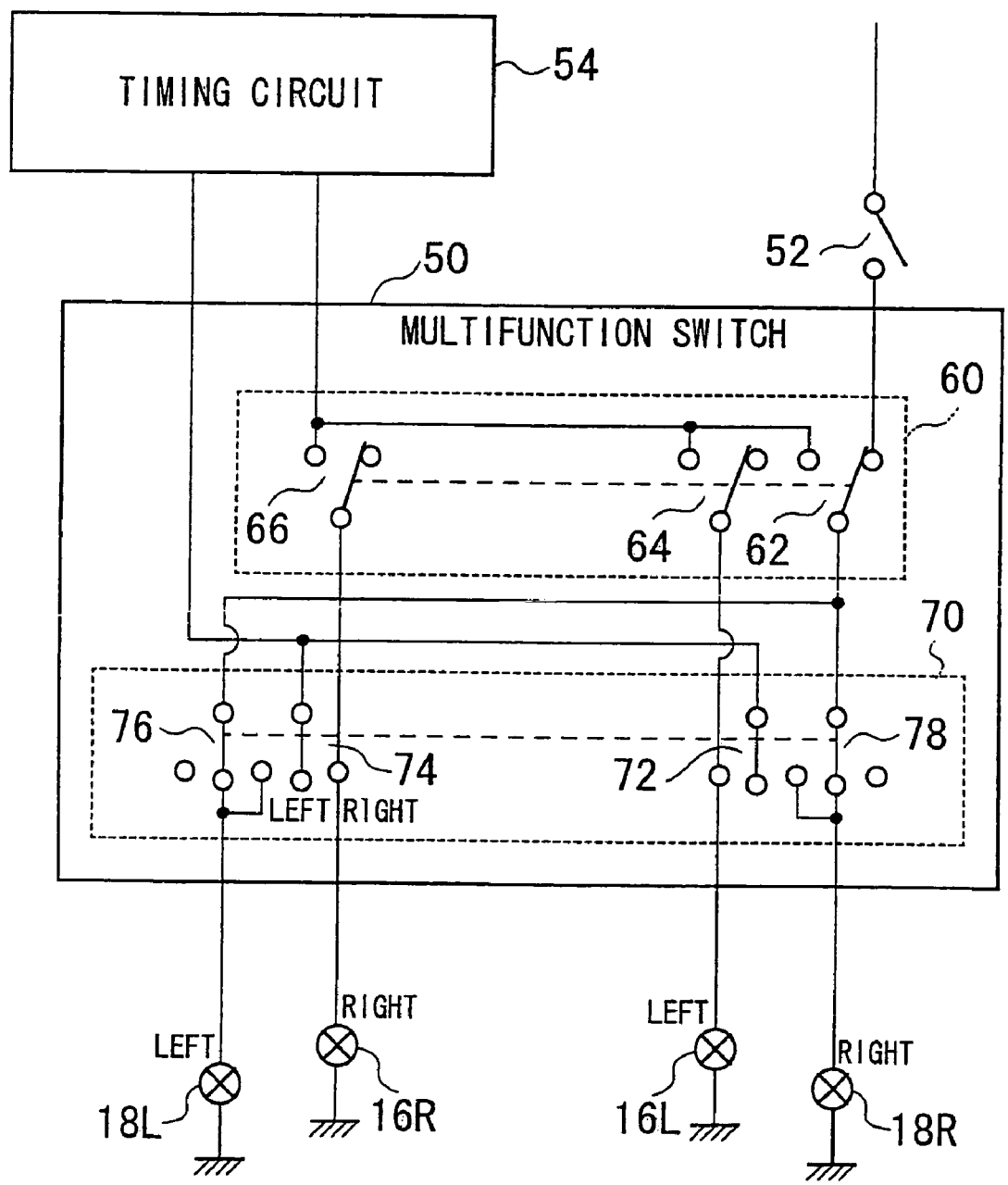
FIG. 9 is a diagram showing a conventional example.

FIG. 8 is a chart showing a case of making the hazard switch 12 OFF from a state in which the stop lamp switch 28, the hazard switch 12 and the turn signal switch (left) 18 have been made ON.

As shown by FIG. 8(a), first, at time t5, when only the stop lamp switch 28 is made ON, the switch mode is made OFF and the left lamp 18L and the right lamp 18R of rear are lighted.

Thereafter, at time t6, when the hazard switch 12 is made ON, the flasher unit 14 is started, the "left" input terminal 20L and the "right" input terminal 20R are inputted with the intermittent signal and the left lamp 16L and the right lamp 16R of the front starts flashing in accordance with the intermittent signal. Also the "COM" terminal 22 is similarly inputted with the intermittent signal.

The switch mode is made ON and therefore, the output of the NAND circuit 38 becomes the H level.

Further, by inputting the intermittent signal, the left integrating circuit 32L and the right integrating circuit 32R become the H level and therefore, the left relay 34L and the right relay 34R are made ON. Thereby, the left lamp 18L and the right lamp 18R of rear are respectively connected to switch from the side of the "STOP" input terminal 24 to the sides of the "left" input terminal 20L and the "right" input terminal 20R and flashed similar to the left and right lamps 16L and 16R of front.

Thereafter, at time t7, when the turn signal switch 10 is made ON, the switch mode remains unchanged, the state of inputting the intermittent signal to the "left" input terminal 20L and the "right" input terminal 20R also remains unchanged and therefore, the state of flashing all of the lamps by making the hazard switch 12 ON continues as it is.

Further, at time t8 during a time period in which the intermittent signal is at H and the lamps are lighted, when the hazard switch 12 is made OFF, although the "left" input terminal 20L is inputted with the intermittent signal via the turn signal switch 10, the "right" input terminal 20R becomes the L level. As a result, at the discharge circuit 50, the output of the NAND circuit 52R becomes the L level and the right integrating circuit 32R connected thereto is rapidly discharged via the diode 44R. Thereby, the right relay 34R is immediately made OFF, the right lamp 18R of the rear stops flashing and is brought into the continuously lighted state in accordance with the stop lamp switch 28. The right lamp 18R of the rear is lighted at time t8 and is, therefore, shifted to the continuously lighted state without being turned off temporarily. Further, the left lamp 18L of rear continues flashing along with the left lamp 16L of front.

Meanwhile, as shown by FIG. 8(b), at time t9 of a time period in which the intermittent signal is at L and the lamp is turned off, when the hazard switch 12 is made OFF, at the time point, both of the "left" input terminal 20L and the "right" input terminal 20R are at the L level and therefore, the respective NAND circuits 52L and 52R in the discharge circuit 50 are at the H level. However, successive H levels of the input signal from the flasher unit 14 is inputted to the "left" input terminal 20L and is not inputted to the "right" input terminal 20R and therefore, the "right" input terminal 20R stays at the L level and therefore, at the time point when the intermittent signal rises, the output of the NAND circuit 52R becomes the L level.

Thereby, the right integrating circuit 32R is rapidly discharged, the right relay 34R is made OFF and therefore, while the left lamps 16L and 18L continue flashing, the right lamp 18R of rear is brought into the continuously lighted state in accordance with the stop lamp switch 28.

Although with regard to an ON state of the turn signal switch 10 in the above-described explanation, "left" is taken as an example, even when "right" is made ON, only "left" and "right" are switched and the state stays the same.

The embodiment is constituted as described above and is the lamp control apparatus for continuously lighting the rear lamps (18L, 18R) based on the stop lamp switch 28 and operating to flash the lamp based on the hazard switch 12 or the like connected to the flasher unit 14, the lamp control apparatus is provided with the relays (34L, 34R) for connecting to switch the lamp to the stop lamp switch or the hazard switch or the like and based on the output of the NAND circuit 38 which is changed by the state of the hazard switch or the like, the relay is driven and when both of the stop lamp switch and the hazard switch or the like are made ON, the lamp is connected to the hazard switch or the like to operate to flash.

Thereby, there is ensured a priority function similar to that of the prior art for giving a priority to the flashing operation by the hazard switch or the like when both of the stop lamp switch and the hazard switch or the like is made ON.

Further, switches having mechanical contacts are only respective single relays present at large current paths to the lamps other than the stop lamp switch and the hazard switch or the like and therefore, the apparatus is realized at low cost, operating sound is reduced and durability and reliability are promoted.

Further, when the relays are provided respectively in correspondence with the left lamp 18L and the right lamp 18R, the stop lamp switch 28 is made ON and the turn signal switch 10 is made ON to either of "left" or "right", the lamp in correspondence with one side at which the lamps are made ON is operated to flash and the lamp in correspondence with the other side is made to continuously be lit and therefore, not only a direction of turning the vehicle can be indicated but also a succeeding vehicle can be made to recognize simultaneously that braking is carried out.

Further, there is constructed a constitution in which for driving the relay, the integrating circuit for integrating the intermittent signal inputted from the turn signal switch 10 is provided, whereas during a time period of making the turn signal switch ON, the left relay or the right relay in correspondence with either of "left" or "right" which is made ON based on the output of the integrating circuit to thereby connect the corresponding lamp to the turn signal switch to operate to flash, when the turn signal switch is made OFF, the relay is made OFF by rapidly discharging the integrating circuit and the corresponding lamp is connected to the stop lamp switch 28 and therefore, in the case in which, for example, the stop lamp switch 28 is made ON, when the turn signal switch is made OFF, the lamp which has been flashed is immediately switched to light continuously and there is no delay in the switching.

Further, when the stop lamp switch 28 is made ON, the hazard switch 12 is made ON and the turn signal switch 10 is made ON to either of "left" or "right", both of the left lamp 18L and the right lamp 18R are operated to flash, when the hazard switch 12 is made OFF, the lamp on one side in correspondence with ON of the turn signal switch 10 is operated to flash, the lamp on other side is made to light continuously and therefore, also when the three switches are made ON, priority of flashing is ensured.

Further, the turn signal switch 10 and the hazard switch 12 are connected with the left lamp 16L and the right lamp 16R of the front, the flasher unit 14 outputs the middle potential Me to the output terminal when the flasher unit 14 is not operated, when the output terminal is grounded from the turn signal switch 10 or the hazard switch 12 via the left lamp 16L or the right lamp 16R, the flasher unit 14 outputs the intermittent signal of H and L, the output of the NAND circuit 38 is changed by inputting the output of the flasher unit 14 and the inverted value of the output to thereby determine whether the turn signal switch 10 or the hazard switch 12 is made ON or OFF and therefore, it can be determined whether the relay needs to drive or not by a simple constitution by utilizing the output of the flasher unit 14.

Further, although according to the embodiment, the switch mode determining circuit is constituted by the NAND circuit 38 for inputting the output of the flasher unit and the inverter 40, further, as the relay driving means, the left and right integrating circuits 32L and 32R and the inverters 36L and 36R are used, the logical elements used therefore are not limited to those illustrated but various circuit constitutions can be adopted such that an AND circuit is used for a logical circuit in place of the NAND circuit 38 by a combination or the inverter is dispensed with.

Similarly, also the constitution of the discharge circuit 50 is not limited to the illustrated example.

As described above, according to the invention, there is provided the relay connected to switch to the first switch for continuously lighting the lamp or the second switch for operating to flash by connecting to the intermittent signal source, when both of the first switch and the second switch are made ON, the switch mode determining circuit operates to flash the lamp by connecting the relay to the second switch by the relay driving means based on the ON state of the second switch and therefore, for example, when the first switch is constituted by the stop lamp switch of the vehicle and the second switch is constituted by the hazard switch, there is achieved a priority function of urging caution to a succeeding vehicle by flashing the lamp based on the hazard switch when both switches are made ON.

Further, the switch mode determining circuit and the relay driving means can be formed by a logical circuit and switches having mechanical contacts related to large current are only relays disposed at large current paths to the lamps other than the first and the second switches and therefore, cost and operating sound are reduced and durability and reliability are promoted.

What is claimed is:

1. A lamp control apparatus using a first lamp both for continuous lighting based on a first switch and a flashing operation based on a second switch connected to an intermittent signal source, said lamp control apparatus comprising:

a relay for connecting the first lamp to the first switch or the second switch;

a switch mode determining circuit for determining a state of the second switch; and relay driving means for driving the relay based on an output of the switch mode determining circuit;

wherein when both of the first switch and the second switch are made ON, the first lamp is connected to the second switch by the relay to thereby operate to flash the first lamp, and wherein the first lamp is a left rear lamp and a right rear lamp in a vehicle, the first switch is a stop lamp switch, the second switch is a turn signal switch for selectively making a "left" or a "right" ON in correspondence with the left lamp or the right lamp, the relay is provided respectively in correspondence with the left lamp and the right lamp, and when the stop lamp switch is made ON and the turn signal switch is made ON to either "left" or "right", the lamp in correspondence with one side which is made ON is operated to flash and the lamp in correspondence with other side is made to light continuously, and wherein the relay driving means includes an integrating circuit for integrating an intermittent signal inputted from the turn signal switch, during a time period in which the turn signal switch is made ON to "left" or "right", the relay in correspondence with the one side which is made ON is made ON based on an output of the integrating circuit, the lamp in correspondence therewith is connected to the turn signal switch to operate to flash, when the turn signal switch is made OFF, the relay which is made ON is made OFF by rapidly discharging the integrating circuit by the switch mode determining circuit and the lamp in correspondence therewith is connected to the stop lamp switch.

2. The lamp control apparatus according to claim 1, wherein the second switch further includes a hazard switch, when the stop lamp switch is made ON, the hazard switch is made ON and the turn signal switch is made ON to either of "left" or "right", both of the left lamp and the right lamp are operated to flash, when the hazard switch is made OFF, the turn signal switch operates to flash the lamp in correspondence with the one side which is made ON and lights continuously the lamp in correspondence with the other side.

3. The lamp control circuit according to claim 1, wherein the second switch is connected with a second lamp, when the intermittent signal source is not operated, the intermittent signal source outputs a middle potential to an output terminal thereof and outputs an intermittent signal of H and L when the output terminal is grounded from the second switch via the second lamp, the switch mode determining circuit includes a logical product circuit for inputting an output of the intermittent signal source and an inverted value of the output and is brought into different output states in accordance with whether the second switch is made ON or OFF.

4. The lamp control circuit according to claim 2, wherein the second switch is connected with a second lamp, when the intermittent signal source is not operated, the intermittent signal source outputs a middle potential to an output terminal thereof and outputs an intermittent signal of H and L when the output terminal is grounded from the second switch via the second lamp, the switch mode determining circuit includes a logical product circuit for inputting an output of the intermittent signal source and an inverted value of the output and is brought into different output states in accordance with whether the second switch is made ON or OFF.

* * * * *